(12) United States Patent
Francis et al.

(10) Patent No.: US 11,525,504 B2
(45) Date of Patent: Dec. 13, 2022

(54) DRIVE TRAIN DESIGN FOR ELECTRIC DRIVEN VEHICLES

(71) Applicant: BorgWarner Inc., Auburn Hills, MI (US)

(72) Inventors: Philip J. Francis, Lapeer, MI (US); Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 162 days.

(21) Appl. No.: 17/087,082

(22) Filed: Nov. 2, 2020

(65) Prior Publication Data
US 2021/0114454 A1    Apr. 22, 2021

Related U.S. Application Data

(63) Continuation-in-part of application No. 15/881,131, filed on Jan. 26, 2018, now Pat. No. 10,823,276.

(51) Int. Cl.
*F16H 57/04* (2010.01)
*B60K 1/00* (2006.01)

(52) U.S. Cl.
CPC ....... *F16H 57/0423* (2013.01); *F16H 57/045* (2013.01); *F16H 57/0476* (2013.01); *B60K 2001/001* (2013.01); *B60Y 2306/03* (2013.01); *B60Y 2400/73* (2013.01)

(58) Field of Classification Search
CPC . F16H 57/0423; F16H 57/045; F16H 57/0476
See application file for complete search history.

(56) References Cited

U.S. PATENT DOCUMENTS

| | | | |
|---|---|---|---|
| 8,534,425 B2 * | 9/2013 | Jabs | F16H 57/0447 184/11.1 |
| 10,378,641 B2 * | 8/2019 | Nakano | F16H 48/40 |
| 11,204,091 B2 * | 12/2021 | Goni | F16H 57/0483 |
| 2006/0179973 A1 * | 8/2006 | Matsufuji | F16H 57/0447 74/606 R |

\* cited by examiner

*Primary Examiner* — Erin D Bishop
(74) *Attorney, Agent, or Firm* — Warn Partners, P.C.

(57) ABSTRACT

A powertrain arrangement for a transverse mounted motor for an electric powered automotive passenger vehicle including opposing wheel shafts for powering two parallel mounted wheels, the shafts rotating about a first axis, the shafts having at least one end torsionally connected with a differential, an electrical rotor torsionally connected with the wheel shafts via a planetary gear train, an electrical stator surrounding the rotor, a casing supporting the rotor and the wheel shafts, the casing encompassing the stator, the casing having a floor forming a lubricant reservoir, and a baffle located in the lubricant reservoir. The baffle forming a wall with a portal allowing flow through the formed wall, and wherein an increase of fluid pressure throttles flow through the formed wall.

15 Claims, 10 Drawing Sheets

DRIVE TRAIN DESIGN FOR ELECTRIC DRIVEN VEHICLES

This application is a Continuation-in-Part of application Ser. No. 15/881,131 filed Jan. 26, 2018. The disclosures of the above application are incorporated herein by reference.

FIELD OF THE INVENTION

The present invention relates to hybrid electric and electric driven automotive vehicles.

BACKGROUND OF THE INVENTION

To reduce carbon emissions and to lower the reliance upon foreign oil, various designs for hybrid electric and electric driven vehicles have been brought forth. To increase mechanical efficiency, various designs for hybrid electric and electric driven vehicles have a transversely mounted motor or motor generator in the vehicle (the term "motor" as used hereinafter refers to motors or motor generators). Typically, the motor is connected to the vehicle wheels via some type of gear train which is inclusive of a differential. The gear train and differential require oil lubrication. The oil lubrication system typically includes a reservoir commonly referred to as the oil pan.

To minimize the energy required to move an automotive vehicle, most vehicles have attempted to lower the spatial envelope of the vehicle to minimize the air resistance of the vehicle as it moves forward. However, for road clearance purposes it is desirable that the floor of the vehicle and of the vehicle power plant is positioned as high as possible. Furthermore, it is desirable for the power plant and power train of a hybrid electric or electric vehicle be as small as possible to help compensate for the spatial requirements of the vehicle battery. To help minimize the spatial requirements, typically the motor of the vehicle is placed within the same casing of the powertrain that connects the motor or motor generator with the vehicle wheels. The level of lubricant within the casing should be low enough that the lubricant does not enter into the air gap between the rotor of the motor and a stator surrounding the rotor. Typically, this is achieved by having oil pan strategically placed underneath the stator with enough volume to ensure that the oil does not reach a level to approach the air gap the stator and the rotor. However, as mentioned previously it is desirable that the oil pan be as shallow as possible to provide for better road clearance of the vehicle. In normal movement of the vehicle, the above noted constraints are easily met. However, when the vehicle is in a high speed turn the fluid within the casing is accelerated to an outboard side of the vehicle. The lateral acceleration can cause the fluid to rise to a level wherein it can reach the air gap between the motor rotor and stator. It is desirable to provide an arrangement for a transverse mounted motor for an electrically powered automotive passenger vehicle wherein fluid acceleration due to cornering maneuvers is restrained from reaching levels wherein it may enter into the air gap between rotor and stator without enslavement to a deep oil pan design configuration. It is also desirable to provide the above noted vehicle arrangement wherein fluid acceleration does not allow the fluid lubrication pump intake to be starved of oil when the vehicle is completing a cornering maneuver.

SUMMARY OF THE INVENTION

To make manifest the above noted and other gainful desires, a revelation of the present invention is brought forth. In a preferred embodiment, the present invention endows a freedom of a powertrain arrangement for a transverse mounted motor for an electric powered automotive passenger vehicle comprising opposing wheel shafts for powering two parallel mounted wheels, the wheel shafts are rotating about a first axis. The wheel shafts have at least one end torsionally connected with a differential. An electrical rotor is torsionally connected with the wheel shafts via a planetary gear train. An electrical stator is surrounding a rotor. A casing is provided that supports the rotor and the wheel shafts. The casing encompassing a stator, the casing has a floor forming a lubricant reservoir. A baffle is located in the reservoir, the baffle has barriers generally transverse to the first axis. The baffle forms a wall with a portal allowing flow therethrough, and wherein an increase of fluid pressure throttles flow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
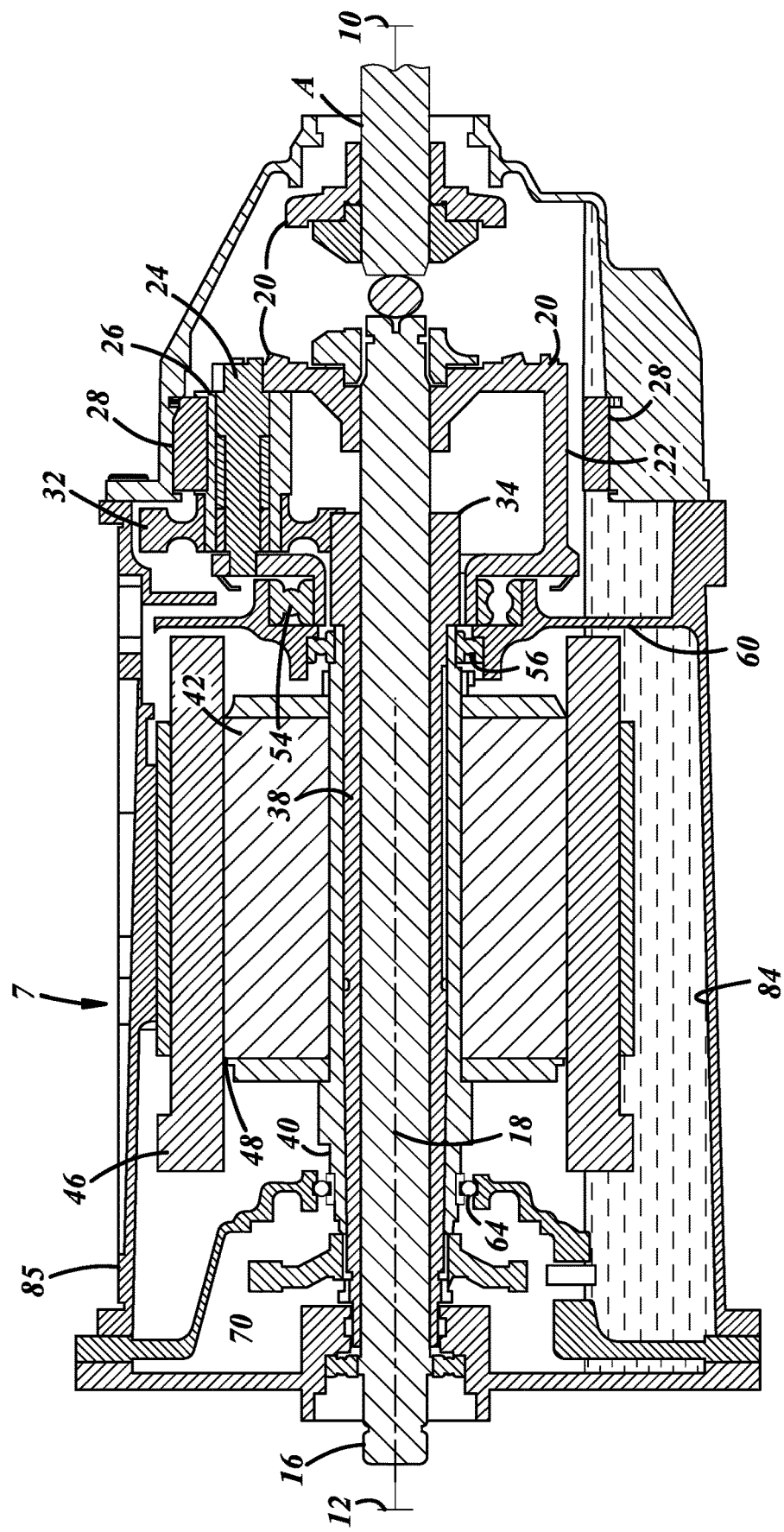
FIG. 1 is a sectional view of a preferred embodiment powertrain arrangement of the present invention with a baffle removed for clarity of illustration.

The following description of the preferred embodiment(s) is merely exemplary in nature and is in no way intended to limit the invention, its application, or uses.

Referring to FIGS. 1 through 6 a preferred embodiment power train arrangement for a transverse mounted motor for an electric powered automotive passenger vehicle is provided (as used hereinafter the term "motor" additionally refers to motor generators and the term "electric vehicle" additionally refers to hybrid electric vehicles). The arrangement 7 has opposing wheel shafts 14 and 16. Parallel mounted wheels 10 and 12 are powered by and connected to wheel shafts 14 and 16 respectively. The wheel shafts 14 and 16 rotate about a first axis 18. The wheel shafts 14 and 16 each have an end torsionally connected with a differential 20.

Differential 20 is fixedly and or integrally connected with a planetary gear set carrier 22. The carrier 22 mounts three carrier pins 24 (only one shown in FIG. 1). Rotatably mounted on the carrier pin 24 is a carrier gear 26 which is engaged with ring gear 28. End carrier gear 26 is fixably connected with and powered by a planetary gear 32. Three planetary gears 32 (only one shown in FIG. 1) are engaged by a sun gear 34. The sun gear 34 is integral with or fixedly connected with a hollow shaft 38. Hollow shaft 38 at an end opposite the differential 20 is torsionally connected with a rotor shaft 40. The rotor shaft 40 is connected with magnetic portion 42. The magnetic portion 42 is part of the rotor assembly. The magnetic portion includes lamination fabricated from thin steel sheets in combination with magnets. Surrounding magnetic portion 42 is a coil winding stator assembly 46. The stator assembly is fabricated from metal laminating and coil windings. An air gap 48 exists between the rotor magnetic portion and the stator assembly coil windings 46.

The differential 20 is supported by roller bearing 54. The bearing 54 is supported on a right central wall 60. A bearing 56 supports the right side of rotor shaft 40. On the left side is a support housing 62. Support housing 62 has a bearing 64 to support the left side of the rotor shaft 40. A parking brake gear 70 is fixedly connected with the shaft 38. A parking brake latch arm 74 (FIG. 5) is selectively engaged with the parking brake gear teeth 76 to place the vehicle in park. A lubricant filter casing 78 is provided having an intake 80 held up by filter casing legs 82 from a floor 84 of the casing 85. The casing floor 84 forms the bottom of the lubricant storage area or oil pan. The floor 84 has a slight tilt towards the filter casing 78 end of the casing 85. The floor 84 tilt is preferably 1 to 2 degrees. Preferably the casing floor 84 will be located at a distance from the rotor 18 equal to or less than two-thirds the diameter of the rotor.

Figure 2:
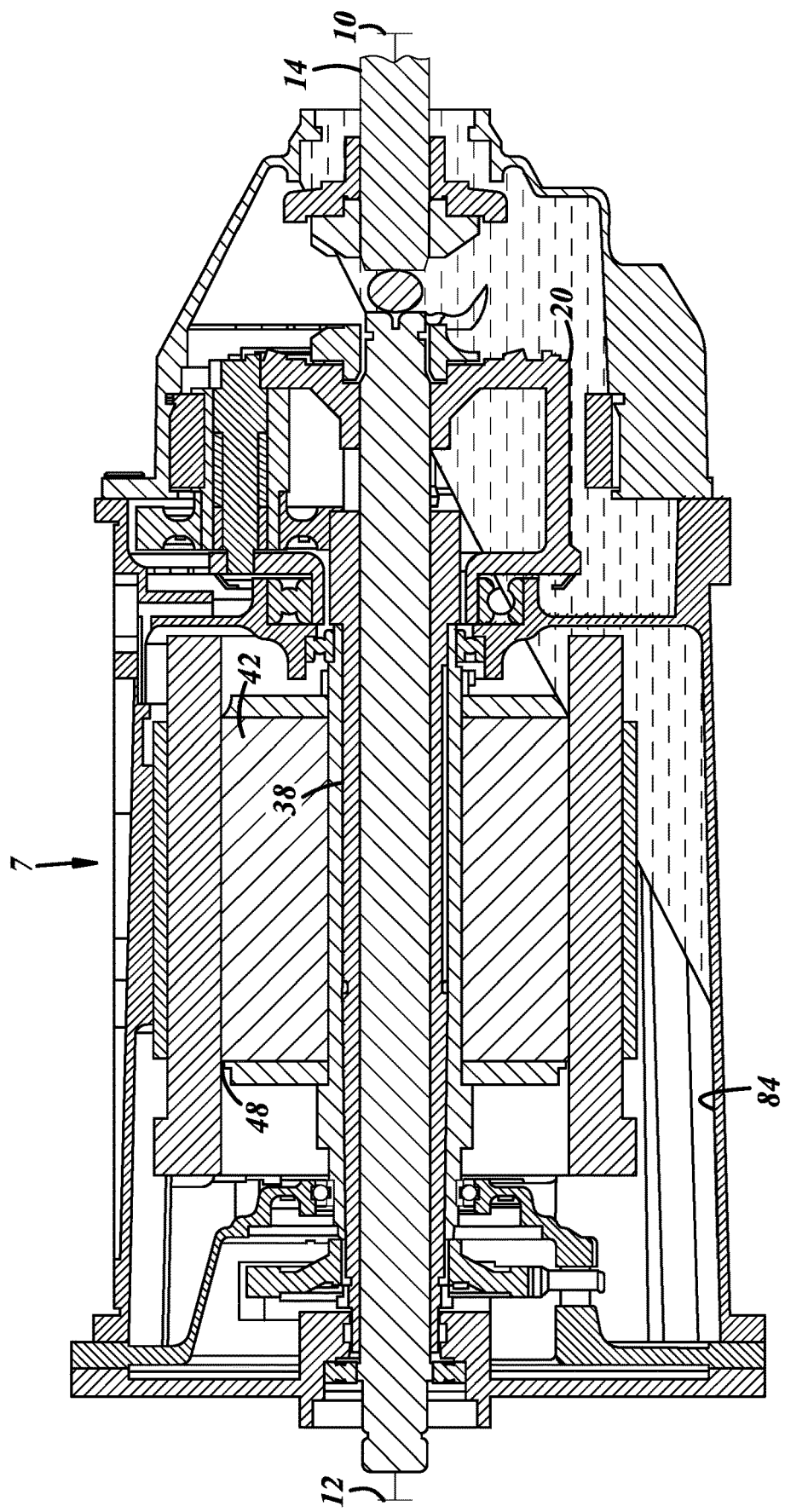
FIG. 2 is a view similar to that of FIG. 1 illustrating acceleration of lubrication fluid due to a cornering maneuver of the vehicle shown in FIG. 1.
Figure 3:
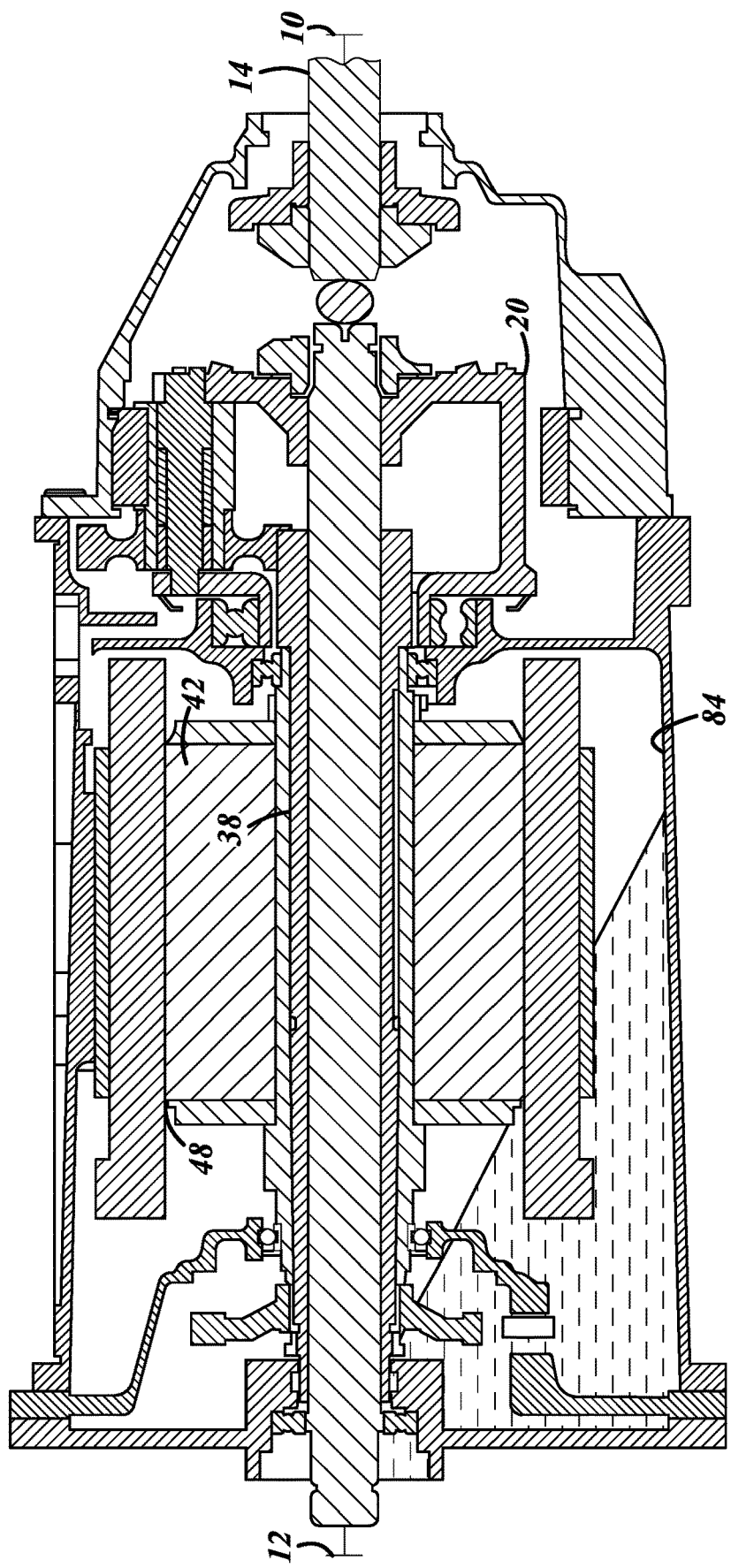
FIG. 3 is a view similar to that of FIG. 1 illustrating acceleration of lubrication fluid due to a cornering maneuver of the vehicle shown in FIG. 1.
Figure 4:
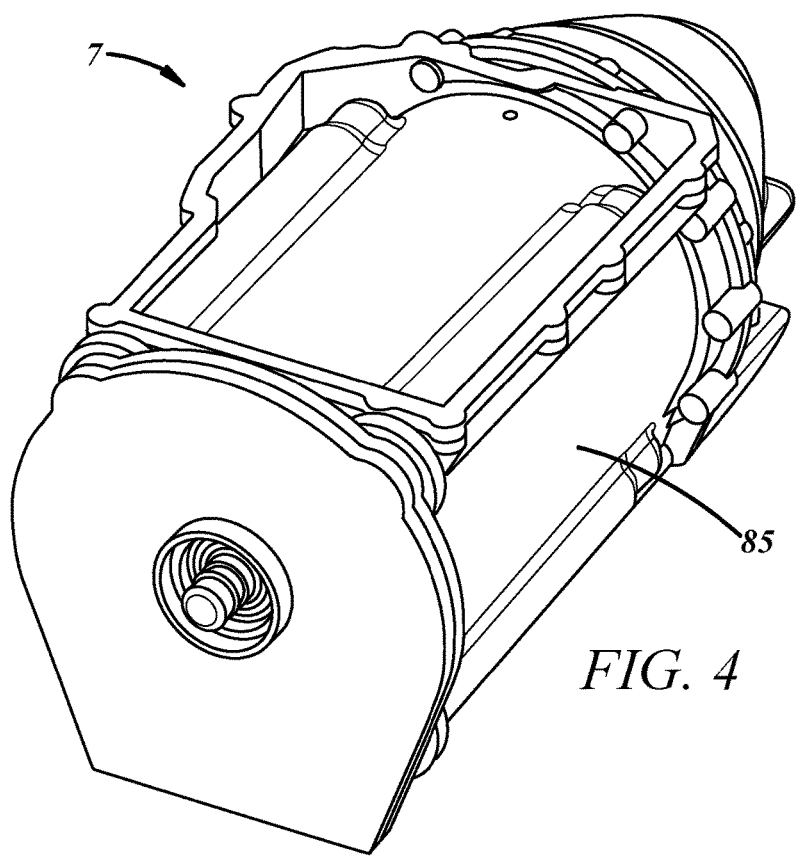
FIG. 4 is a perspective view of the powertrain arrangement of FIG. 1.
Figure 5:
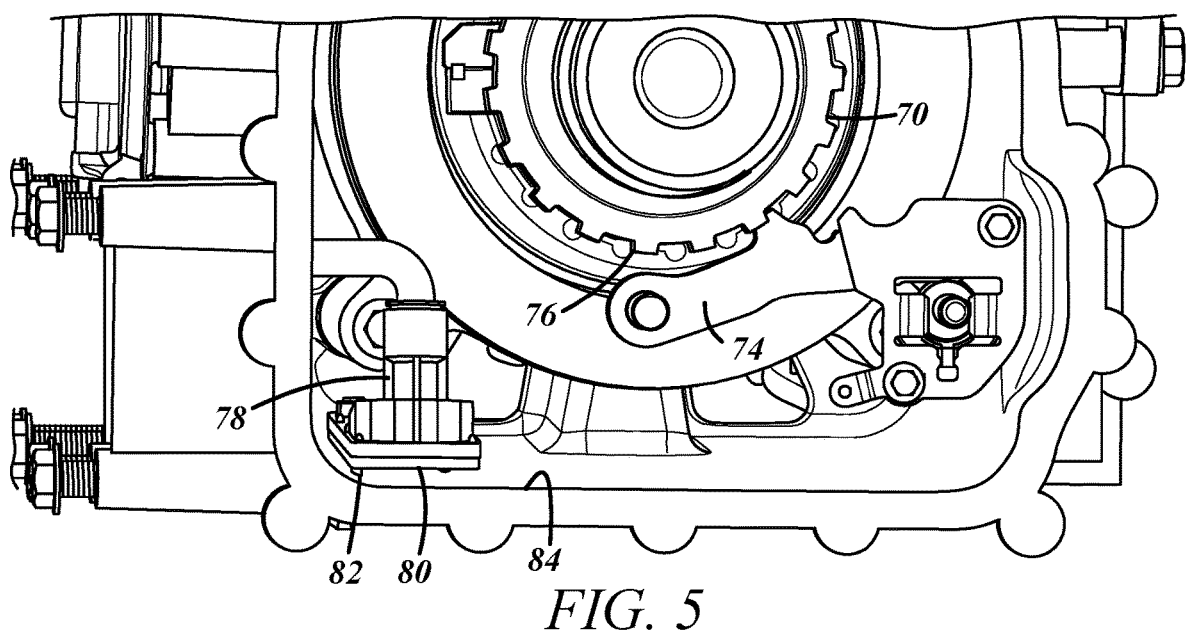
FIG. 5 is a partial side elevational view of the powertrain arrangement of FIG. 1 with a baffle removed for clarity of illustration.
Figure 6:
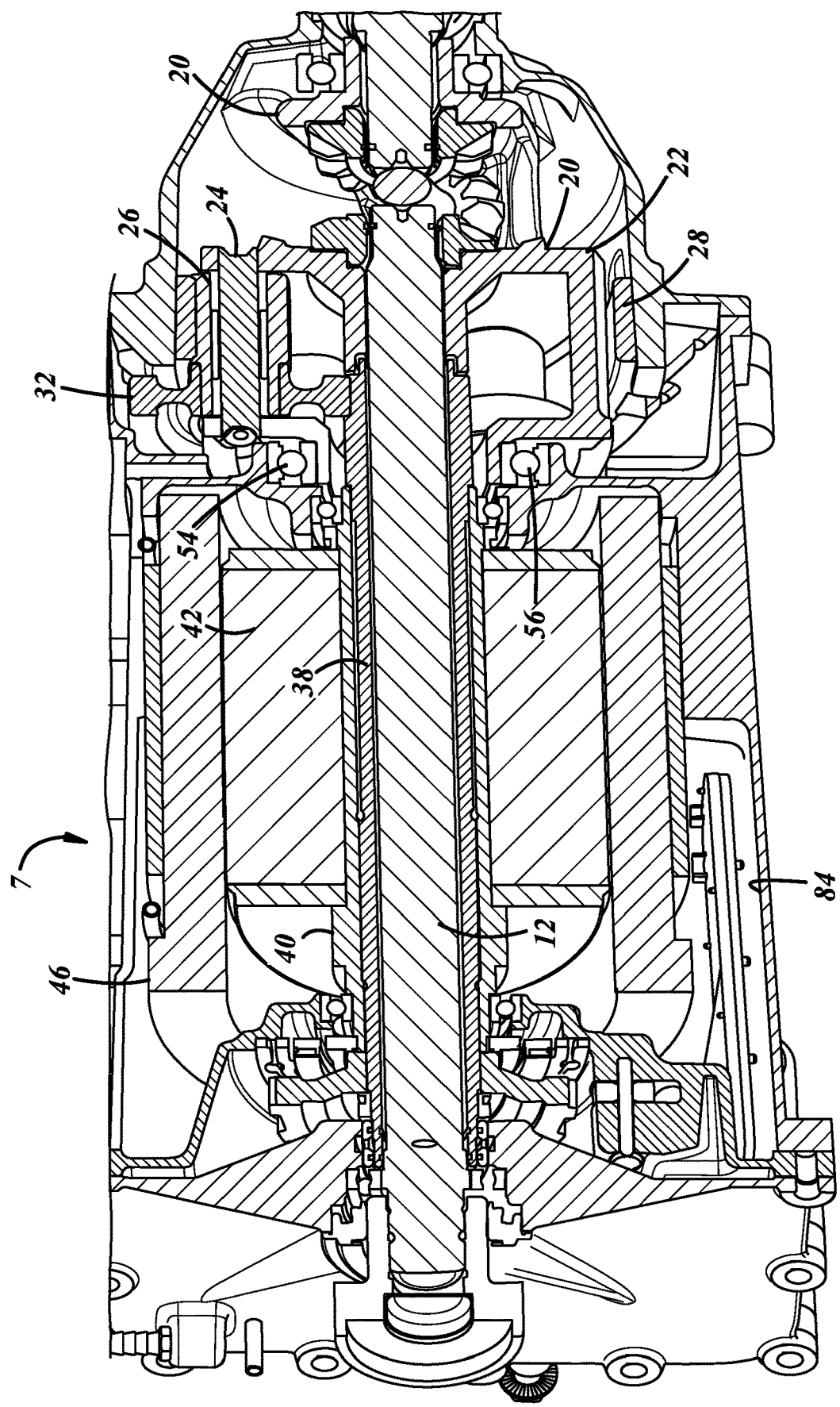
FIG. 6 is a section perspective view of the powertrain arrangement shown in FIG. 1.
Figure 7:
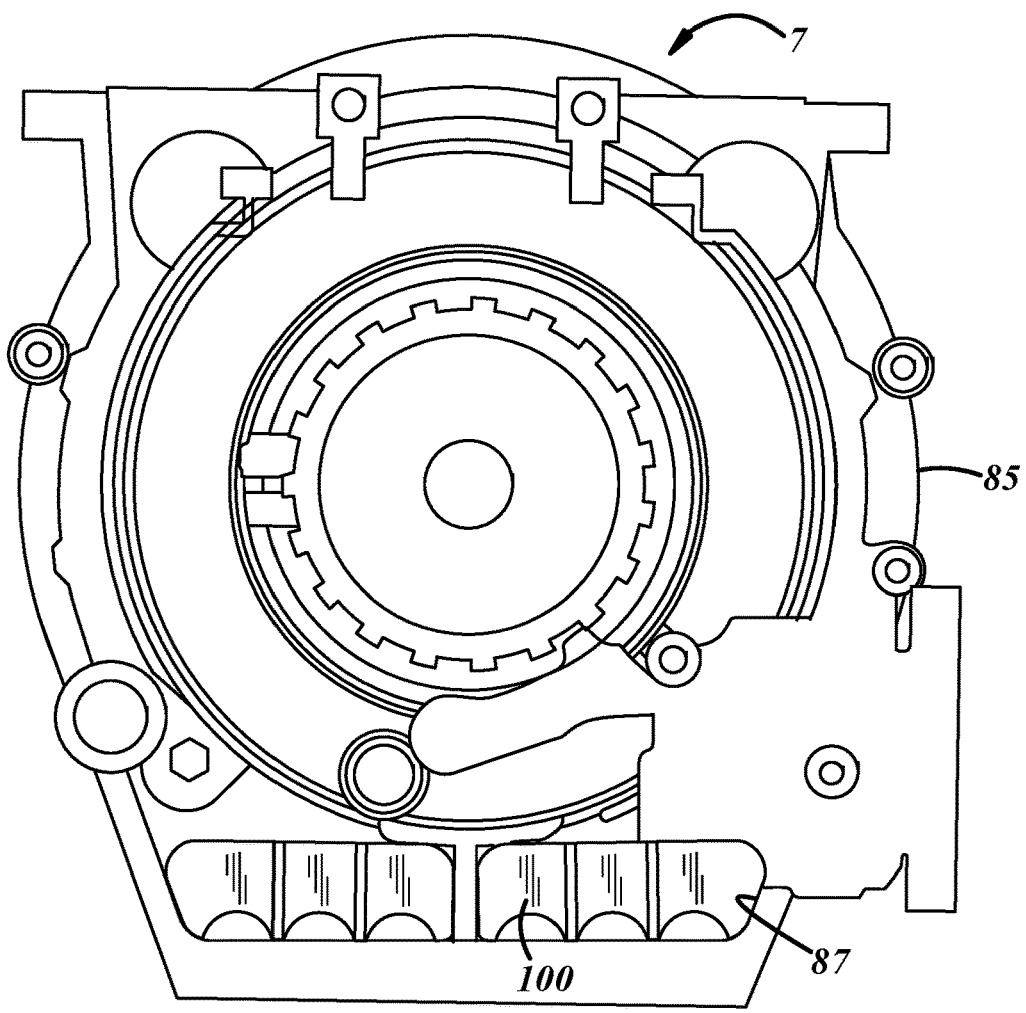
FIG. 7 is a side elevational view of the powertrain arrangement shown in FIG. 1 illustrating the baffle with portions of the lube pump filtering system not shown for clarity of illustration.
Figure 8:
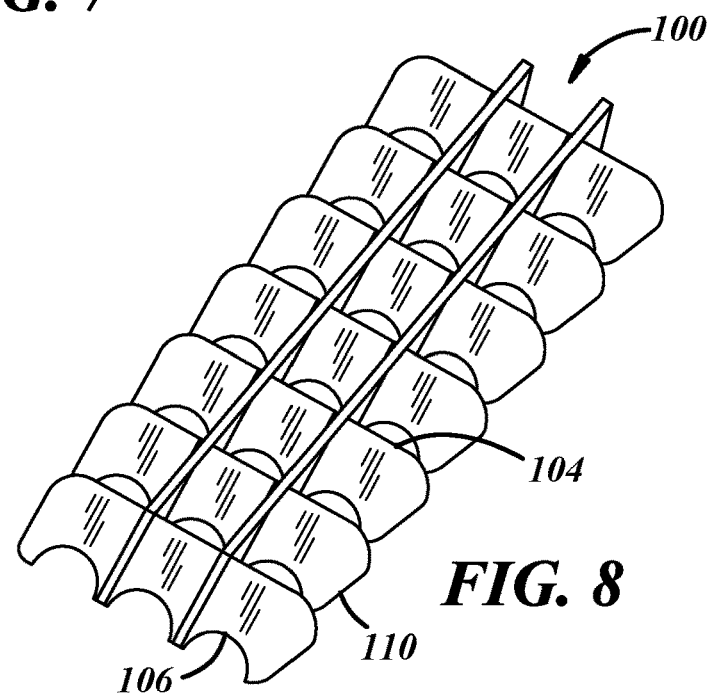
FIG. 8 is a perspective view of the baffle shown in FIG. 7.

To keep the oil from rising along the lines shown in FIGS. 2 and 3 due to lateral acceleration of the vehicle due to cornering or other maneuvers, a baffle 100 is provided. Excessive oil rise can temporarily starve the lubrication pump intake 80. Also, excessive oil rise can possibly foul components of the motor. The baffle 100 has a series of generally parallel spacial barriers 104, generally transverse to the first axis 18. Most if not all of the barriers 104 along their lower end have a series of crescent-shaped windows 106 functioning as oil migration channels. The baffle 100 can additionally have a plurality of barriers 108 generally parallel to the first axis 18. The barriers 104 on the outboard edges 110 of the casing 85 can be contorted to match a lateral edge 87 for the casing. The baffle 100 can be slid into the casing 85. In operation, the lubricant oil is restrained laterally by the baffle and the oil level rise due to lateral acceleration is limited to an amount to ensure that the pump intake 80 is not starved and that the components of the motor are not fouled by the lubricant oil.

Figure 9:
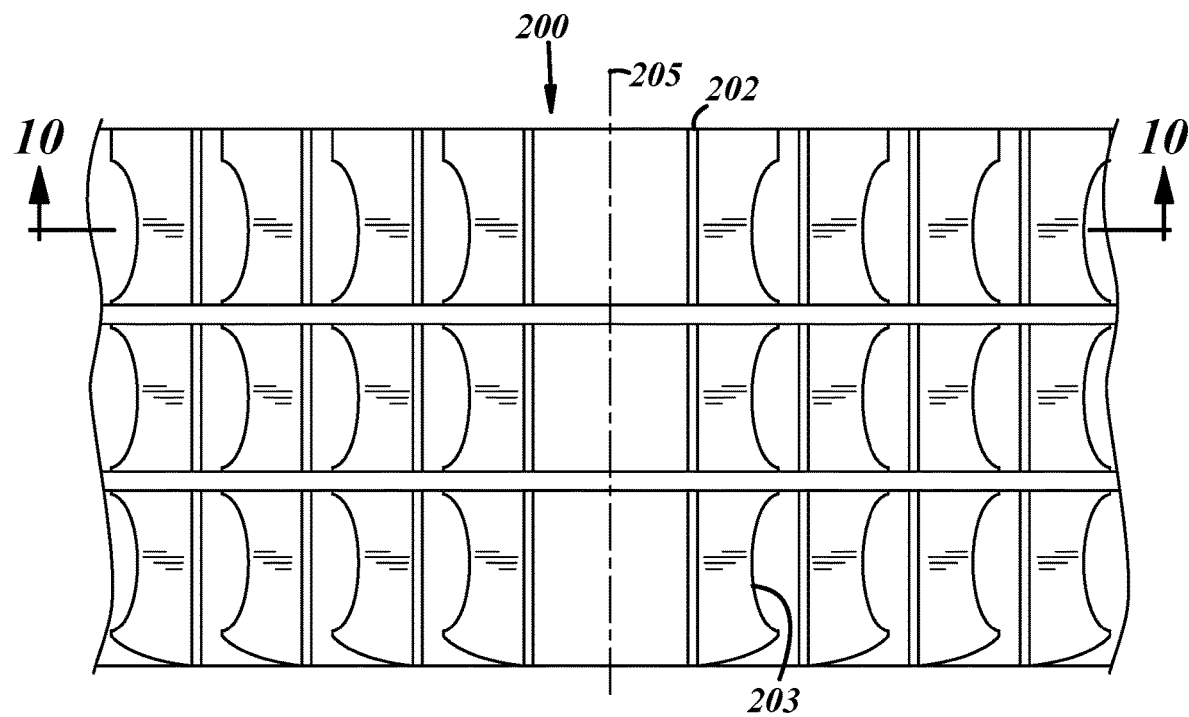
FIG. 9 is a top plane view of an alternate preferred embodiment baffle.
Figure 10:
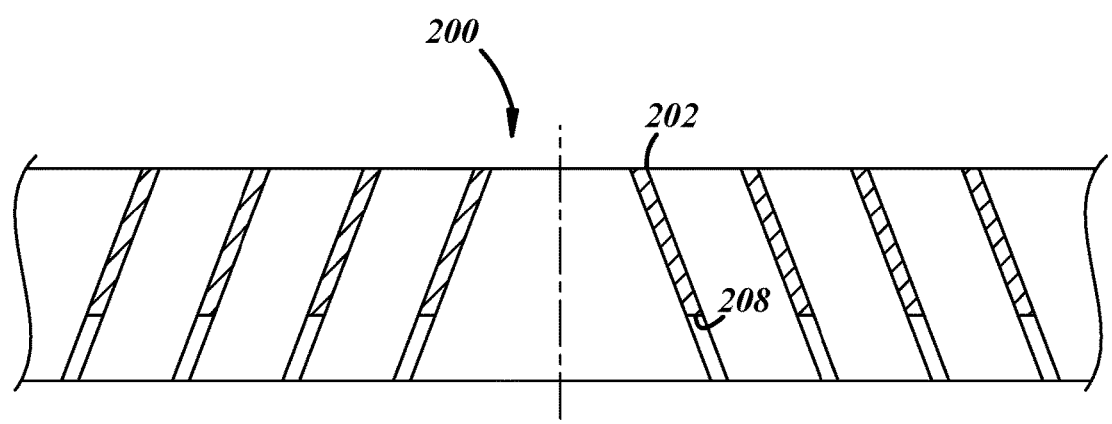
FIG. 10 is a view taken along lines 10-10 of FIG. 9.

In an example shown in FIGS. 9 and 10, the baffle 200 has transverse barriers 202 on an incline that is directed toward a longitudinal centerline 205 of the vehicle that the casing 85 is placed in (in other words, the transverse barrier 202 on the passenger side of the vehicle is slanted bottom to top towards the driver's side of the vehicle and vice versa). The barriers 202 have windows 203.

Figure 11:
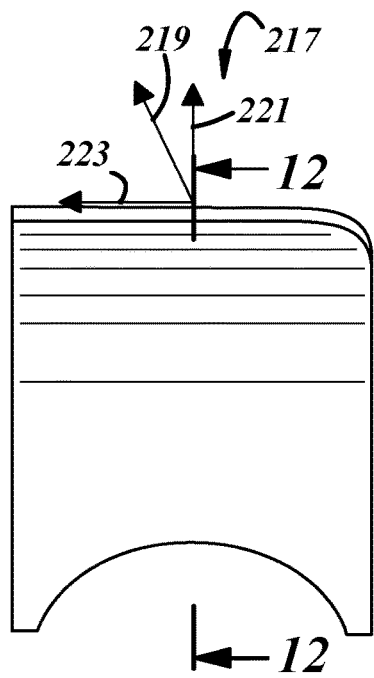
FIG. 11 is a front plan view of an alternate preferred embodiment baffle.
Figure 12:
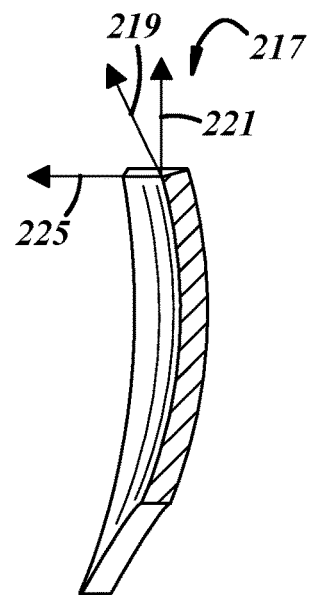
FIG. 12 is a view taken along lines 12-12 of FIG. 11.

Referring to FIGS. 11 and 12, an alternate preferred embodiment barrier has turbine-shaped transverse barriers 217. The barriers 217 are curvilinear in all three geometric axes so that fluid accelerated into the transverse barrier 217 by lateral acceleration of the vehicle is imparted along vector 219. Vector 219 has an upward horizontal flow component 221, lateral flow component 223, and reverse flow component 225. The flow vectors of the various transverse barriers of a given baffler can be varied to provide maximum dampening of fluid movement.

Figure 13:
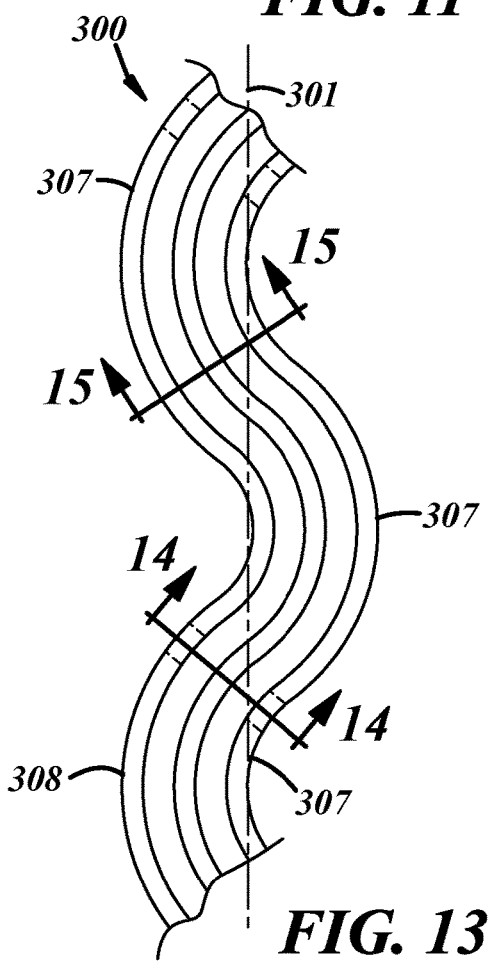
FIG. 13 is a top plane view of an alternate preferred embodiment baffle.
Figure 14:
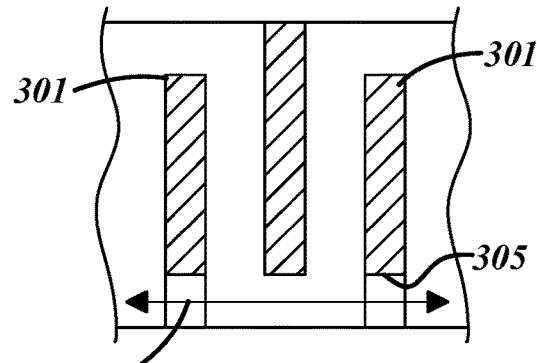
FIG. 14 is a view taken along lines 14-14 of FIG. 13.
Figure 15:
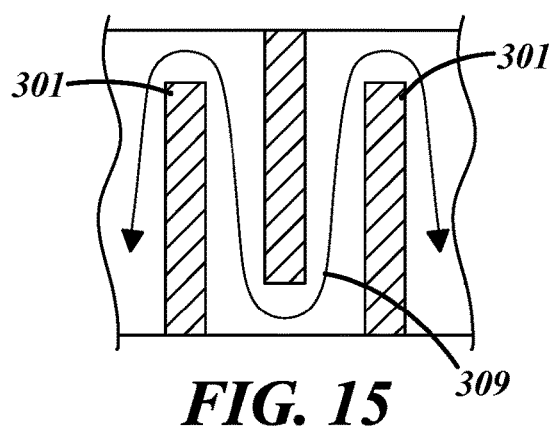
FIG. 15 is a view taken along lines 15-15 of FIG. 13.

FIGS. 13-15 provide another embodiment baffle 300 having transverse barriers 301 extending from the floor, having sinusoidal shape. The baffle also has a series of alternating sinusoidal shaped barriers 303 extending from a ceiling of the baffle or from the bottom of the stator assembly. The barriers 301 have windows 305 between the apices 307 (along the axis 18) of their sinusoidal shape. The up and down flow 309 over the transverse barriers 301 and 303 and the flow 313 through the windows 305 dampen the acceleration of the transverse flow when the vehicle is cornering.

Figure 16:
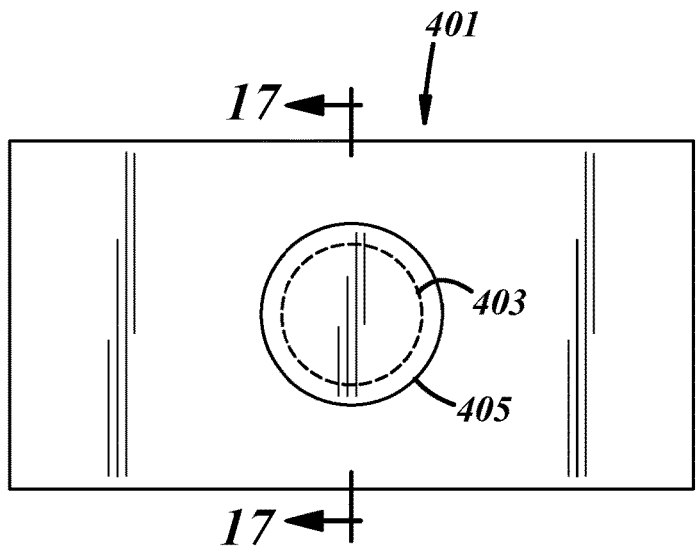
FIG. 16 is an alternate preferred embodiment baffle.
Figure 17:
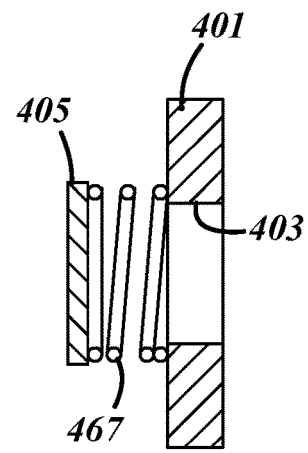
FIG. 17 is a view taken along line 17-17 of FIG. 16.
Figure 20:
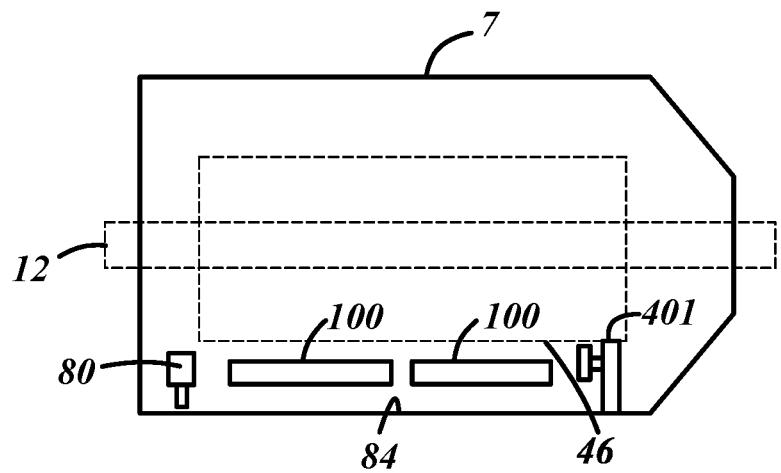
FIG. 20 is a schematic view illustrating utilization of an alternate preferred embodiment of the present invention including a formed wall with a flow through portal.
Figure 21:
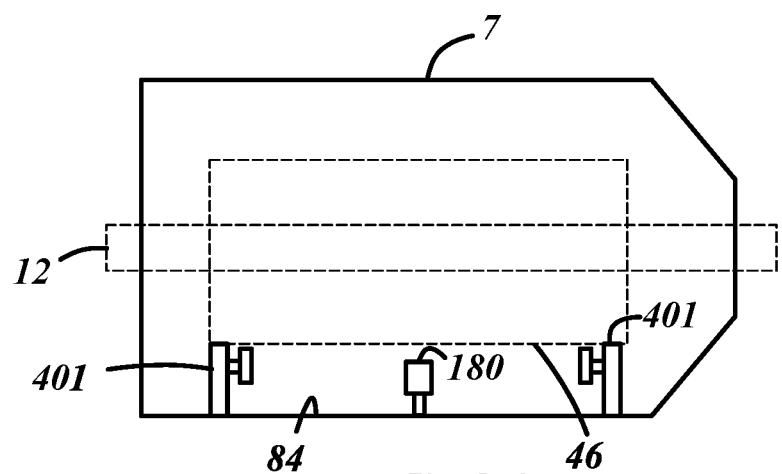
FIG. 21 is a schematic view illustrating another utilization of an alternate preferred embodiment of the present invention including a formed wall with a flow through portal.

Referring to FIGS. 16 and 17, a transverse barrier 401 forms a wall with a singular or multiple portals 403. A stopper 405 is compliantly positioned and biased away from the portal 403 by a spring 407 to throttle flow through the portal 403 by a spring 407 to throttle flow through the portal 403. Fluid pressure resultant of fluid acceleration causes stopper 405 to be pushed toward the portal 403 and throttle the flow therethrough. When the vehicle exits a curve, the spring 407 will return the stopper to allow free flow of oil past the portal 403. Transverse barrier 401 can be utilized with or without baffle 200, or transverse barrier 217 or transverse baffle 300. Typically, barrier 401 can be on the floor 84 on an end of the arrangement 7 towards the differential 20 end with the stopper 405 oriented towards the center of the arrangement 7 see FIG. 20. FIG. 21 schematically illustrates an embodiment of the present invention wherein there are two transfers barrier's 401 with an intake 180 for the arrangement located between the barriers. Any appropriate level of lateral vehicle acceleration will tend close one of the barriers to check the fluid between them to ensure fluid is always over the intake 180, see FIG. 21. In other embodiments (not shown) spring 467 can be replaced by conical variable diameter spring or the portal 403 can be located lower adjacent to floor 84. Additionally barrier 401 one can have multiple number of portals and stoppers and can be completely sealing of an area between the floor 81 to the winding 46 to make axially separate fluid containing areas. Additionally, barrier 401 can be laterally extending the full width (in the longitudinal vehicle direction of the arrangement 7 (or in other words transverse to rotor shaft 40). Furthermore when there are multiple portals, the portals can be set at different biasing forces to allow for more refined fluid flow in the reservoir due to temperature differentials or to control other fluid properties.

Figure 18:
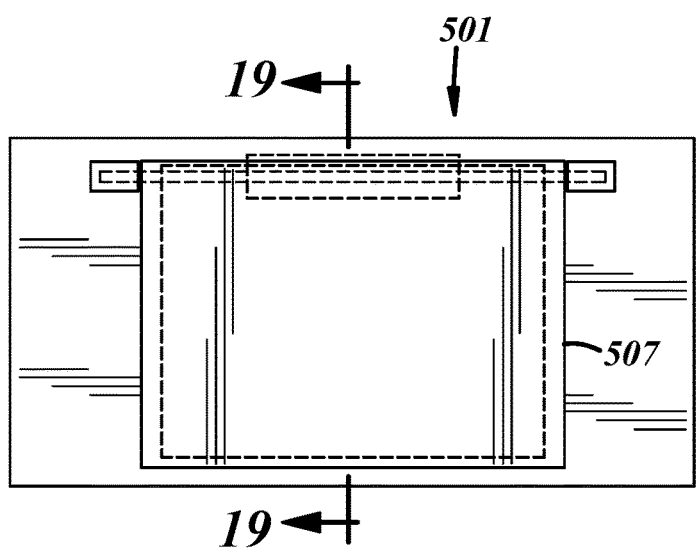
FIG. 18 is an alternate preferred embodiment baffle.
Figure 19:
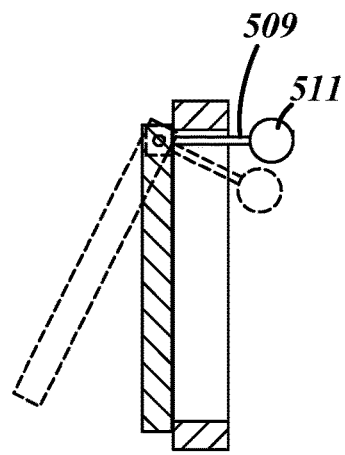
FIG. 19 is a view taken along line 19-19 of FIG. 18.

Referring to FIGS. 18 and 19, a barrier 501 has a portal 503. A pivotal flap 507 covers portal 503. Pivotal flap 507 is biased open by a weight 511 on a lever 509 that is torsionally connected with the flap 507. Barrier 501 operates in a manner similar to that of barrier 401.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A powertrain arrangement for a transverse mounted motor for an electric powered automotive passenger vehicle comprising:
    opposing wheel shafts for powering two parallel mounted wheels, said shafts rotating about a first axis, said shafts each having at least one end torsionally connected with a differential;
    an electrical rotor torsionally connected with said wheel shafts via a planetary gear train;
    an electrical stator surrounding said rotor;
    a casing supporting said rotor and said wheel shafts, said casing encompassing said stator, said casing having a floor radially spaced outward away from said first axis forming a lubricant reservoir; and
    a baffle located in said lubricant reservoir;
    at least one barrier generally transverse to said first axis and said transverse barrier forms a wall with a portal allowing flow through said formed wall, and wherein an increase of fluid pressure throttles flow through said formed wall.

2. The powertrain arrangement as disclosed in claim 1 wherein said rotor has a first diameter and said casing floor is distanced from said first axis at a distance equal to or less than 67% of said diameter of said rotor.

3. The powertrain arrangement as described in claim 2, wherein there are a plurality of said transverse barriers, and multiple portals are axially separated and a suction intake is located between said portals.

4. The powertrain arrangement as described in claim 1 wherein said portal is biased by compliant loading or loading by weight.

5. The powertrain arrangement as described in claim 4, wherein there are a plurality of said transverse barriers and wherein at least two of said portals of said plurality of transverse barriers have different biasing forces.

6. The powertrain arrangement as described in claim 1, wherein there are a plurality of said transverse barriers, and respective portals are axially separated and a suction intake is located between said portals.

7. A powertrain arrangement for a transverse mounted motor for an electric powered automotive passenger vehicle comprising:
    opposing wheel shafts for powering two parallel mounted wheels, said shafts rotating about a first axis, said shafts each having at least one end torsionally connected with a differential;
    an electrical rotor torsionally connected with said wheel shafts via a planetary gear train;
    an electrical stator surrounding said rotor;
    a casing supporting said rotor and said wheel shafts, said casing encompassing said stator, said casing having a floor radially spaced outward away from said first axis forming a lubricant reservoir;
    a baffle located in said lubricant reservoir, said baffle having barriers projecting radially inward from said floor toward said first axis generally transverse to said first axis and at least one of said baffle barriers having a window along a radially outward extreme end of said at least one baffle barrier allowing fluid communication on said floor through said at least one baffle barrier; and
    a transverse barriers that forms a wall with a portal allowing flow through said formed wall, and wherein an increase of fluid pressure throttles flow through said formed wall.

8. The powertrain arrangement as disclosed in claim 7 wherein said baffle additionally has additional barriers extending generally parallel to said first axis.

9. The powertrain arrangement as disclosed in claim 7, wherein a plurality of said baffle barriers have windows.

10. The powertrain arrangement as described in claim 7 wherein said portal is biased by compliant loading or loading by weight.

11. The powertrain arrangement as described in claim 10, further comprising at least one additional transverse barrier with a portal, wherein at least two of said portals have different biasing forces.

12. The powertrain arrangement as described in claim 7, further comprising at least one additional transverse barrier with a portal, wherein said multiple portals are axially separated and a suction intake is located between said portals.

13. A method of powering an electric powered automotive passenger vehicle comprising:
    providing opposing wheel shafts for powering two parallel mounted wheels, said shafts rotating about a first axis, said shafts each having at least one end torsionally connected with a differential;
    providing a transverse mounted electrical rotor torsionally connected with said wheel shafts via a planetary gear train;
    providing an electrical stator surrounding said rotor;
    providing a casing supporting said rotor and said wheel shafts, said casing encompassing said stator, said casing having a floor radially spaced outward away from said first axis forming a lubricant reservoir; and
    providing a baffle located in said lubricant reservoir;
    at least one transverse barrier generally transverse to said first axis, said transverse barrier forming a wall with a portal, and said portal throttles flow upon acceleration of fluid.

14. The method as disclosed in claim 13 wherein said portal is compliantly biased to an open position.

15. The method as disclosed in claim 13 wherein said portal is biased by a weighted lever.

* * * * *